(12) United States Patent
Jaff et al.

(10) Patent No.: US 7,281,261 B2
(45) Date of Patent: Oct. 9, 2007

(54) REMOTELY ACCESSING AND PROGRAMMING A SET TOP BOX

(75) Inventors: Kosar Jaff, Redmond, WA (US); David N. Junod, Evans, GA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 09/896,066

(22) Filed: Jun. 29, 2001

(65) Prior Publication Data

US 2003/0005446 A1   Jan. 2, 2003

(51) Int. Cl.
*H04N 7/173*   (2006.01)
*H04N 7/16*   (2006.01)
*H04N 5/445*   (2006.01)
*H04N 5/91*   (2006.01)
*G06F 3/00*   (2006.01)
*G06F 13/00*   (2006.01)

(52) U.S. Cl. .................... 725/132; 725/30; 725/51; 725/58; 386/83

(58) Field of Classification Search ............... 725/51, 725/58, 30, 87, 132; 709/208; 386/83
See application file for complete search history.

(56) References Cited

U.S. PATENT DOCUMENTS

| | | | | |
|---|---|---|---|---|
| 5,679,943 A * | 10/1997 | Schultz et al. | ......... | 235/472.02 |
| 5,751,282 A | 5/1998 | Girard et al. | ............... | 345/327 |
| 5,764,281 A * | 6/1998 | Seo | ............... | 348/55 |
| 5,886,730 A * | 3/1999 | Tsosie | ........... | 725/25 |
| 6,246,441 B1 * | 6/2001 | Terakado et al. | ............ | 348/552 |
| 6,505,348 B1 * | 1/2003 | Knowles et al. | ............ | 725/49 |
| 6,704,787 B1 * | 3/2004 | Umbreit | ............ | 709/229 |
| 6,732,158 B1 * | 5/2004 | Hesselink et al. | ............ | 709/208 |
| 6,906,696 B2 * | 6/2005 | Allport | ............ | 345/156 |
| 2001/0014206 A1 * | 8/2001 | Artigalas et al. | ............ | 386/83 |
| 2001/0046366 A1 * | 11/2001 | Susskind | ............ | 386/46 |
| 2002/0002707 A1 * | 1/2002 | Ekel et al. | ............ | 725/87 |
| 2002/0021766 A1 * | 2/2002 | Iwai | ............ | 375/316 |
| 2002/0046407 A1 * | 4/2002 | Franco | ............ | 725/110 |
| 2002/0184635 A1 * | 12/2002 | Istvan | ............ | 725/51 |
| 2003/0095791 A1 * | 5/2003 | Barton et al. | ............ | 386/83 |
| 2004/0221157 A1 * | 11/2004 | Venkatachary et al. | ..... | 713/155 |

(Continued)

FOREIGN PATENT DOCUMENTS

EP   0963109   12/1999

(Continued)

OTHER PUBLICATIONS

DeYonker, Aaron; Remote DVR Functional Spec, Mercury 1.1, Section 13, Mar. 11, 2001, 5 pgs.

*Primary Examiner*—Scott E. Beliveau
*Assistant Examiner*—Joseph G Ustaris
(74) *Attorney, Agent, or Firm*—Workman Nydegger

(57) ABSTRACT

Systems and methods for remotely programming a set top box and for remotely scheduling an event on a set top box. A set top box includes a server that allows an access device to access the set top box over an always on connection between the set top box and a network such as the Internet. The access device retrieves program guide data that is locally stored on the set top box and, using the program guide data, selects and schedules events. The events are sent back to the set top box over the connection where they are implemented by the set top box.

30 Claims, 4 Drawing Sheets

U.S. PATENT DOCUMENTS

2005/0028206 A1* 2/2005 Cameron et al. ............. 725/46
2005/0028208 A1* 2/2005 Ellis et al. .................... 725/58

FOREIGN PATENT DOCUMENTS

| WO | WO97/13368 | 4/1997 |
| WO | WO99/57904 | 11/1999 |
| WO | WO00/78045 | 12/2000 |
| WO | WO 0078050 | * 12/2000 |

* cited by examiner

REMOTELY ACCESSING AND PROGRAMMING A SET TOP BOX

BACKGROUND OF THE INVENTION

1. The Field of the Invention

The present invention relates to systems and methods for remotely accessing and programming a set top box. More particularly, the present invention relates to systems and methods for remotely scheduling events on a set top box.

2. Background and Related Art

Consumers are beginning to have access to a large number of television programs over an increasing number of television channels. Set top boxes such as cable boxes, satellite receivers, and digital video recorders or combinations thereof are becoming more popular because they provide certain advantages that were not previously available. Set top boxes, for example, allow users to digitally record programming content such as television programs, lock certain channels from being accessed without permission, view electronic program guide data, and set personal preferences that control how the program guide data and/or programming content is presented to the user.

The ability to digitally record a television program is particularly useful because users are often unable to view a particular television program when it is scheduled for broadcast or because there is more than one program that the user desires to view. Sometimes, the user knows that he or she will be unable to view a certain television program well in advance. For example, the user may be taking a planned vacation. In this instance, the user is able to directly program the set top box from their home to record the program. By recording the television program, the user is able to view the program at their leisure.

Some users, however, decide to record a program shortly before the program is scheduled to begin. Because of the relatively short notice, these users often find themselves in situations that prevent them from successfully recording the desired program. For example, the user may be at work, cannot get home in time to record the television program, have another commitment that conflicts with the television program, etc. For example, a user, while at a sporting event, may discover that their favorite program is a new episode instead of a repeat episode. In these types of situations, the user is simply unable to record their favorite program because they are not home to program the set top box to record the program.

Many set top boxes simply require the presence of the user in order to schedule an event, such as recording a television program. The problem, stated generally, is that users are unable to access their set top boxes from a remote location such that an event can be scheduled at the set top box. Attempts have been made, however, to provide a way for users to record programs or schedule events when they do not have direct access to their set top box.

One attempt involves using a proprietary server that stores program guide data. Periodically, the set top box will access the proprietary server in order to update the program guide data stored in the set top box. To schedule an event in this case, the user accesses the proprietary server through a network, such as the Internet. Once logged on to the proprietary server, the user may view the program guide data stored on the proprietary server and input programming instructions or schedule an event that will be downloaded to the set top box of the user.

One of the problems with this approach is related to the difference between the program guide data provided by the proprietary server and the program guide data that is stored on the user's set top box. When a user is at home, the program guide data is often personalized. For example, favorite channels have been selected and identified, locks have been set on certain channels, the amount of program guide data displayed has been customized by the user, events that have already been scheduled are reflected to the user, and the like. In other words, some users have personalized their program guide data such that it is easier to navigate when they are scheduling an event such as recording a program or simply browsing the program guide data.

The program guide data provided by the proprietary server, on the other hand, is not personalized and is most likely not organized in the same manner as the program guide data stored on the user's set top box. Previously scheduled events of the user are not reflected in the program guide data and the user's preferences are not available to the user. In addition, the program guide data provided by the proprietary server may be much more voluminous than the program guide data stored on the set top box of the user. For example, the user's set top box may have access to many different channels, but the user set input preferences such that the program guide data for only 15 channels is displayed by the set top box. When the user logs on to the proprietary server, the user may have to wade through program guide data for significantly more than 15 channels in order to find a television program the user desires to record. Being presented with such a large quantity of information by the proprietary server is burdensome to the user. The user thus experiences difficulty when interacting with the proprietary server that they would not experience at home when using their own program guide data. In spite of these difficulties, a user can overcome these limitations and identify an event at the proprietary server, such as identifying a program to record. However, users may experience more difficulty in navigating the program guide data as the volume of the program guide data provided by the proprietary server continues to grow.

Another problem with this approach is that the set top box only accesses the proprietary server and downloads data periodically. When the set top box downloads guide data, it usually downloads guide data for an identified time period, a week for example. This creates a problem when a user desires to record a program on short notice because the set top box may not access the proprietary server to retrieve the instructions left by the user soon enough to actually record the program.

SUMMARY OF THE INVENTION

The present invention overcomes these and other problems and provides systems and methods for remotely accessing and programming a set top box. In accordance with the present invention, the client system or the set top box has an always-on connection with a network such as the Internet. An access device may remotely access a set top box at any time because the set top box has an always-on connection. In some instances, the set top box does not have an always-on connection, in which case the present invention causes the set top box to establish a bi-directional connection with the network such that the set top box may be remotely accessed and programmed.

The always-on connection of the set top box can allow users to log on to the set top box with a remote access device using standard protocols. In some instances, the user is authenticated by the set top box or through an authentication service. After logging on to the set top box, the program guide data from the set top box of the user can be served or transmitted to the remote access device. This enables the user to remotely view the program guide data that is stored on their own set top box on a remotely located access device. Depending on the access device, the program guide data can be presented to a user as it is presented to a user when the program guide data is accessed from the set top box directly. In some instances, the access device uses a device service that formats the program guide data according to the access device.

At the access device, a user is able to schedule an event or input programming instructions using the program guide data that is being displayed on the access device. After an event has been selected or scheduled, the event is sent back to the set top box. The set top box then implements the event that was created at the remote access device. In this manner, a user is able to remotely access and program a set top box or remotely schedule an event.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

Figure 1:
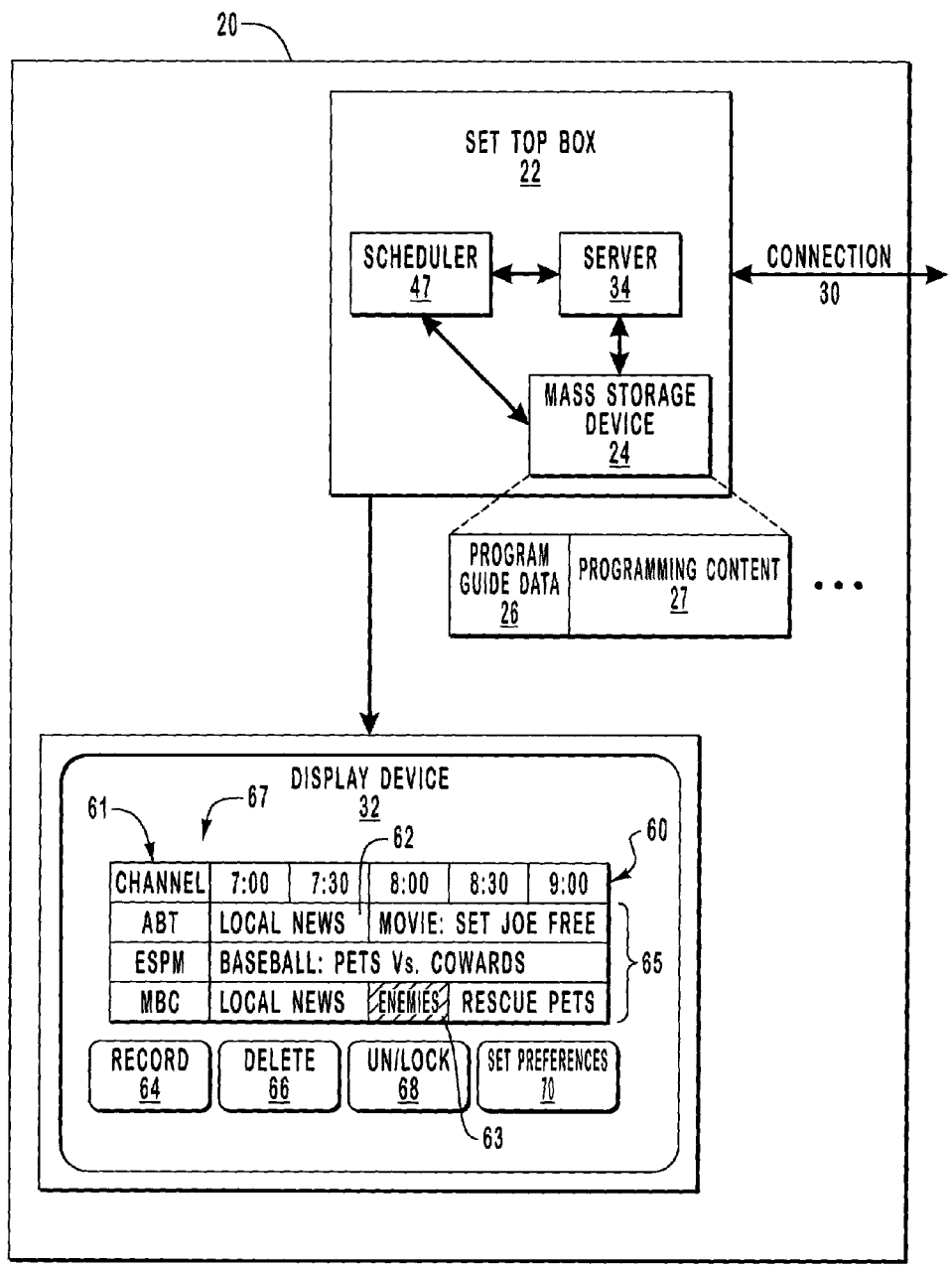
FIG. 1 illustrates a programmable client system including a set top box.

The present invention extends to both systems and methods for remotely programming a client system or a set top box and to systems and methods for remotely scheduling an event on a set top box. A client system, as used herein, refers to a set top box individually or to a set top box that is connected with a display device. Examples of set top boxes include, but are not limited to, cable boxes, satellite receivers, digital video recorders (DVR), video cassette recorders (VCR), internet appliances, and combinations thereof. In some instances, the display device, such as a television, is integrated with the set top box or is separate from the set top box. Many set top boxes also provide the ability to connect with a computer network such as the Internet.

An "event" as used herein refers to actions that are programmed or scheduled on a set top box. Events include, but are not limited to, setting user preferences, locking or unlocking one or more channels or programs, recording one or more programs, causing a program to not be recorded, setting conflict resolution preferences, and the like.

As used herein, electronic "program guide data" refers to data that describes programming content or television programming and includes, but is not limited to, program start times, program end times, program and movie ratings, program summaries, program titles, channels, program duration, and the like. More generally, the program guide data describes the programming content that is received at the set top box. The set top box typically has the ability to display the program guide data to a user such that the program guide data may be viewed and manipulated. As used herein, programming content or data includes, but is not limited to, television programs or other video/audio data that is received by the client system and that may be stored in the memory of the set top box or rendered by a display device.

The embodiments of the present invention may comprise a special purpose or general purpose computer including various computer hardware, as discussed in greater detail below. Set top boxes that enhance the capabilities of conventional televisions represent an example of a special purpose computer. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

FIG. 1 and the corresponding discussion are intended to provide a general description of an exemplary client system that includes a set top box. FIG. 1 illustrates a programmable client system 20 that includes a set top box 22 and a display device 32. As previously described, the set top box 22 may be a cable box, a satellite receiver, a VCR, a DVR, any combination thereof, and the like. The set top box 22 is connected to the display device 32, which may be a high definition television display, a standard television display, a flat panel display, a projection device, a high definition television display, a computer monitor, or any other device capable of displaying television programs, programming content, program guide data and the like.

Set top box 22 also includes a storage device 24, which may be a magnetic hard disk or any other magnetic or optical or non-volatile memory device that is capable of storing data. The storage device 24, for example, is used to store events, program guide data 26, programming data or content 27, and the like. The storage device 24 can also be used to record programming content 27 that is received over a connection 30. The scheduler 47 is a module that allows a user to program the set top box 22 or to schedule an event.

A display 67 shows one example of how program guide data that is retrieved from the storage device 24 might appear on the display device 32. The program guide data 26 is typically displayed using a row and column format, as shown by way of example in display 67. A row 60 displays times of the day during which programming content will be broadcast. A column 61 identifies and displays channels over which programming content will be received by the client system 20. Rows 65 list the programming content that will be broadcast on the channels identified in the column 61 at the times indicated by the row 60. For example, a program listing 62 specifies that the program "Local News" will be broadcast on channel ABT from 7:00 to 8:00.

The display 67 also includes icons that are used to program the set top box 22 or to select and schedule an event. In this example, the display 67 includes a record icon 64, a delete icon 66, an unlock/lock icon 68 and a set preferences icon 70. To record a program, the user will select a program, such as the program 63, and the program 63 will be shaded or an icon displayed, for example, to indicate that it has been selected. After the program 63 is selected, the user can click or select the record icon 64. This causes a record event to be scheduled by the scheduler 47 and the event is often stored on the storage device 24. The program 63 begins at 8:00, as shown in the display 67. At the specified time that is identified by the program guide data, the program 63 will be recorded by the set top box 22 and will likely be stored on the storage device 24.

In another example, the display 67 may already show the program 63 as being shaded or an icon displayed, for example, indicating that an event has been scheduled for that program. If the user no longer desires to record the program 63, the user can simply select the program 63 and then click on or select the delete icon 66. This event will cause the program 63 to not be recorded. In a similar manner, other events can be scheduled.

Events are not limited to particular programs, but can be applied to channels, or to certain time periods, or to programs that have a certain rating, and the like. For example, a user can indicate that all channels that are not appropriate for a certain age group according to the rating be locked using a lock event.

The user may also select the set preferences icon 70 to manipulate the configuration of the display 67. For example, the user may set preferences such that only selected channels will appear on the display 67. Thus, the display 67 is only an example of one possible configuration of a display and events are not limited to those described herein.

The connection 30 is a bi-directional connection that is preferably always-on. Examples of the connection 30 include a cable modem, an Integrated Serviced Digital Network (ISDN) lines, a Digital Subscriber Line (DSL) line, and the like that provide the set top box 22 with access to programming content and to a network such as the Internet. The connection 30 can also be a connection that is not always-on, such as a standard telephone line. Preferably, the connection 30 is always-on. Many set top boxes are configured to receive data while their ability to send data is more limited. The set top box 22 includes a server 34 that gives the set top box 22 the ability to also send or serve data over the connection 30 in addition to receiving programming Content.

The set top box 22 also has other components that allow programming content to be displayed on the display device 32. These components include one or more tuners for tuning the programming content, one or more demodulators for demodulating the tuned programming content, a transport module for selecting a channel or video stream from the demodulated programming content, and a decoder for decoding the channel or video stream. After the channel or video stream is decoded, the audio and video components can be sent to the display device 32. The channel or video stream can also be recorded on the storage device 24.

Figure 2:
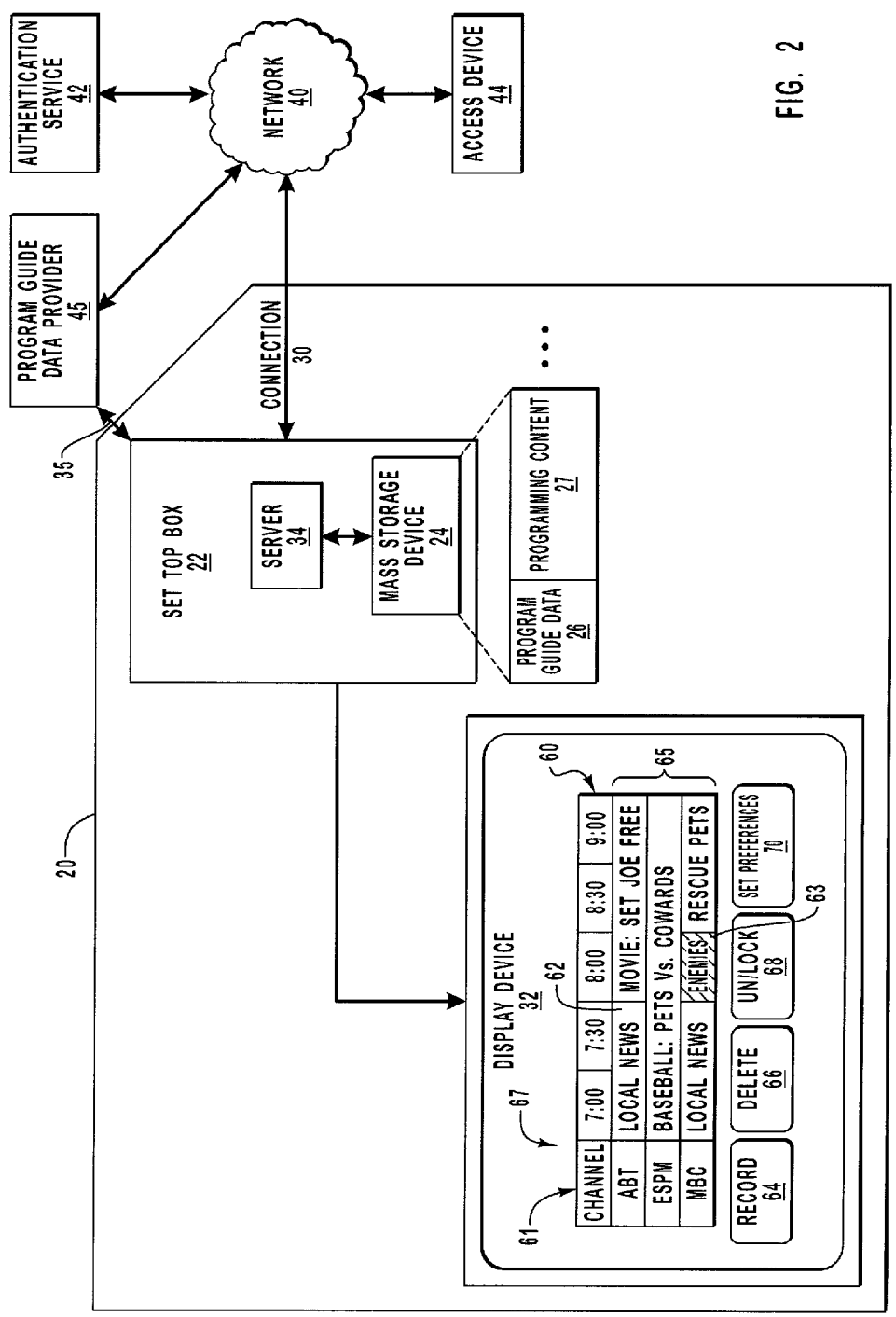
FIG. 2 illustrates a block diagram of an exemplary system for remotely scheduling an event on a set top box.

FIG. 2 illustrates a block diagram of an exemplary system for remotely interacting with the client system 20 such that an event may be scheduled. The connection 30 connects the set top box 22 to a network 40 such that the set top box 22 is, in this example, always online with the network 40. Examples of network 40 include, but are not limited to, the Internet, local area networks, wide area networks, or any other type of network through which computing devices commonly interact with each other.

The set top box 22 receives program guide data from a provider 45 either through a direct connection 35, or via the network 40 and over the connection 30, although the set top box 22 may obtain program guide data from a different source. The program guide data is supplied on a regular or periodic basis to continually maintain a current schedule of program guide data or program listings at the client system 20. The program guide data obtained from the provider 45 is typically stored on the storage device 24.

Alternatively, the program guide data may be delivered to the client system 20 by using a direct-dial communication over standard telephone lines, or by using data transmission over the cable television infrastructure, a satellite network, an over-the-air broadcasting, or any other available medium.

In FIG. 2, a user uses an access device 44 to remotely interact with the client system 20 via the network 40. To access the client system 20, a user first connects the access device 44 to the network 40. The user then connects the access device 44 to the client system 20 via the network 40 and over the connection 30. Accessing the set top box 22 in this manner often requires a user to authenticate herself to the set top box 22 or log on to the set top box 22. This can be accomplished through the server 34 of the set top box using, for example, a challenge and response. Alternatively, the user can use an authentication service 42 that authenticates the user to the set top box 22. This assumes that the user has previously registered with the authentication service 42 and obtained a user identifier (such as a user name and password) from the authentication service 42. The user identifier issued by the authentication service 42 can be used at all sites that have an association with the authentication service 42. In this case, the user logs on to the set top box 22 using a user identifier (such as a user name and password) that were issued by the authentication service 42. The set top box 22 then verifies the user with the authentication service 42. Microsoft Passport™ is one example of the authentication service 42.

Because a user is remotely logging on to the set top box 22, the set top box 22 will typically have an Internet Protocol (IP) address. The IP address is often known to the user or can be determined from configuration data of the set top box 22. In some instances, the set top box 22 can be identified using a static IP address or by a third party service that provides a link to the IP address of the set top box 22. For example, in a cable system, the IP address of the set top box 22 is often supplied by the cable company and may be dynamic.

Once the user has obtained access to set top box 22, the user may retrieve data from set top box 22 such as the program guide data 26 stored on the storage device 24. The server 34 serves the program guide data 26 to the access device 44, where it is displayed to the user in the same or modified configuration as the program guide data 26 is displayed on the display device 32.

The user may also use the access device 44 to schedule events to occur at the client system 20 or at the set top box 22. As previously discussed, those events can include, but are not limited to, recording programming content, deleting recorded programming content, manipulating user preferences of program guide data 26, or performing any other functions that the set top box 22 commonly performs. For example, a user is able to select a program on the access device 44 using the displayed program guide data. After the program has been selected, the user can select the record icon that is displayed on the access device 44, thus scheduling the selected program to be recorded by set top box 22. This event is sent to the set top box 22 over the connection 30 using standard protocols. The event is then implemented on the set top box by the scheduler of the set top box. In this manner, a user is able to remotely schedule an event on their set top box.

Figure 3:
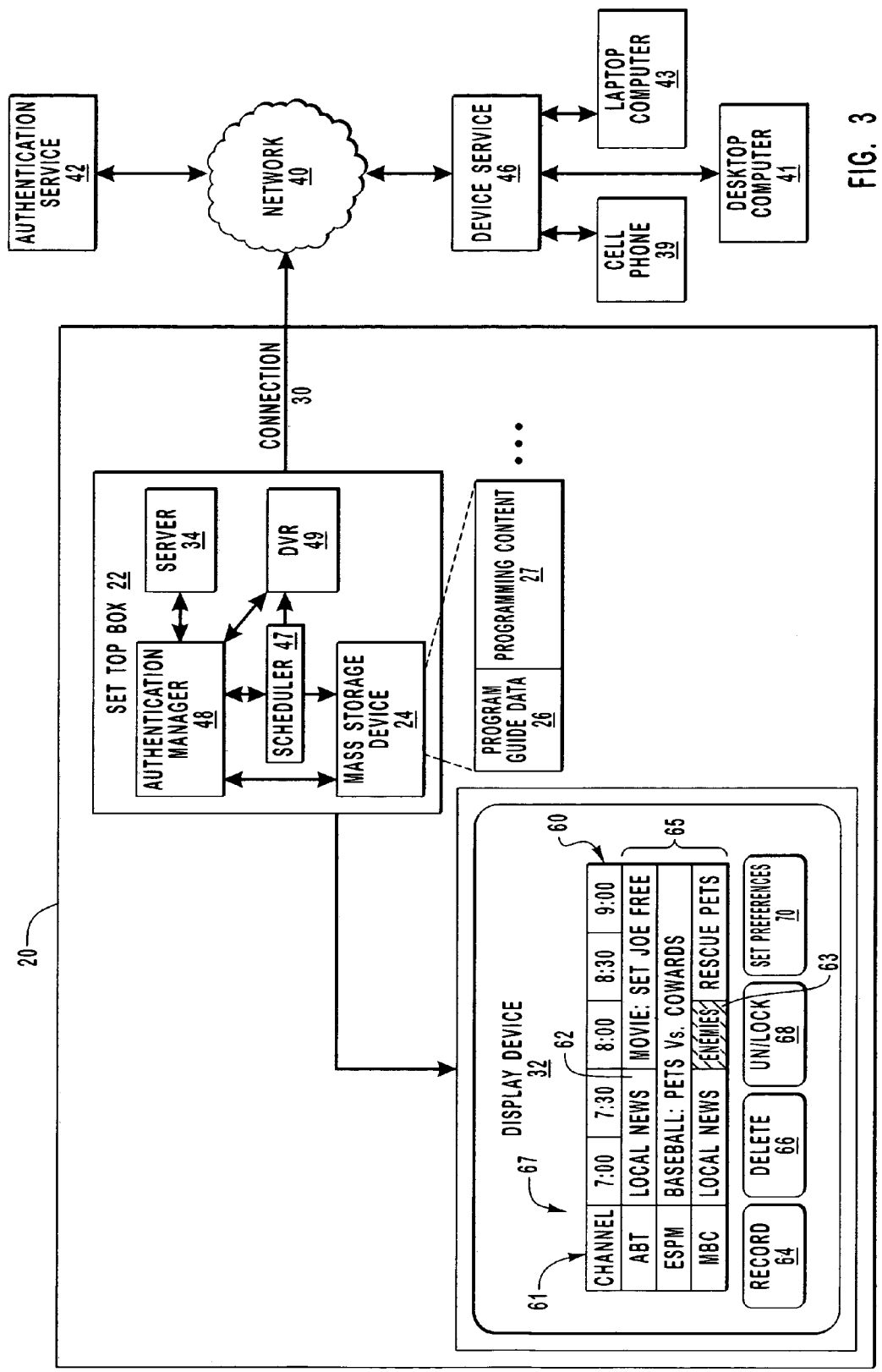
FIG. 3 illustrates a block diagram of another exemplary system for remotely interacting with a set top box using a device service.

FIG. 3 illustrates another embodiment of an exemplary system for remotely scheduling an event on the client system 20. In this example, the access device 44 of FIG. 2 is represented by, but not limited to, devices such as a cell phone 39, a desktop computer 41, a laptop computer 43 or any other device, such as a personal digital assistant (PDA) or Internet appliance, that is commonly used to access a network. In this example, the user will log on to the device service 46 with one of the access devices. When the user logs on to the device service 46 with an access device, the user is often required to submit usernames and/or passwords that are specific to the access device. For example, the cell phone 39 typically uses numerical data for authentication purposes while the desktop computer 41 and the laptop computer 43 are more likely to employ alphanumerical data for authentication purposes.

The device service 46 is associated with the authentication service 42 and the device service 46 automatically authenticates the user with the authentication service 42 whenever the user logs on to the device service 46 with an access device. The set top box 22 illustrated in FIG. 3 is also associated with the authentication service 42 in this example. As a result, the authentication manager of the set top box 22 is able to automatically authenticate a user that attempts to access or remotely program the set top box 22 through the authentication service 42 and the user is relieved of having to supply another username and/or password to the set top box 22.

One advantage of the device service 46 is that it dynamically recognizes the specific access device of the user. The device service 46 is thus able to appropriately format all data that is sent to the particular access device. For example, if the user uses laptop computer 43 to connect to device service 46, access set top box 22, and retrieve program guide data 26, then the device service 46 automatically formats the program guide data 26 to appear on the laptop display in the same or similar configuration as the program guide data 26 is displayed on the display device 32. Alternatively, if the user connects the cell phone 39 to the device service 46 in order to access the set top box 22 and retrieve the program guide data 26, the device service 46 automatically appropriately formats the program guide data 26 to, for example, a menu driven configuration suitable to be displayed on the cell phone 39.

When the user connects to the set top box 22 through the server 34, the authentication manager 48 communicates, via server 34, over connection 30 and via network 40, with the authentication service 42 to assure that the user attempting to connect with the server 34 is authorized to access set top box 22. Once the authentication manager 48 has authenticated the user with the authentication service 42, with which the user has previously registered as described above, the user may have full access to interact with set top box 22. If the user is not authenticated, then the authentication manager 48 prohibits the user from retrieving data or scheduling events on the set top box 22.

Once the authentication manager 48 has authenticated the user, the user may retrieve data or schedule events on the set top box 22 in the same manner described in FIG. 2. For example, the user may schedule an event causing the set top box 22 to record a particular program. The scheduler 47, upon receiving the remotely scheduled event, schedules the event on the set top box 22 or implements the programming instructions. The DVR 49 indicates that the set top box has the capability to digitally record programming content.

Figure 4:
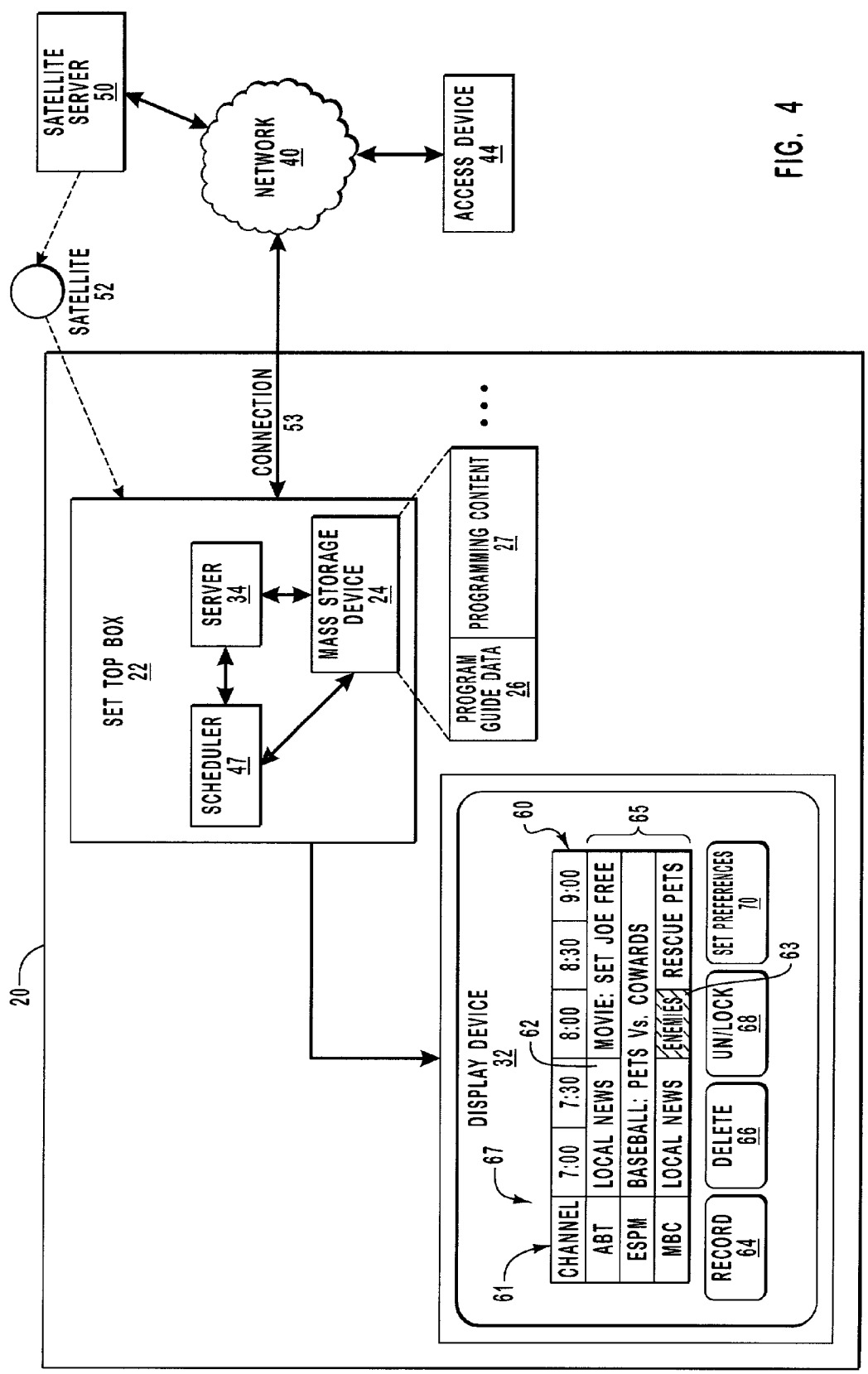
FIG. 4 illustrates a block diagram of another exemplary system for remotely scheduling an event on a set top box using a satellite link.

FIG. 4 illustrates a block diagram of an exemplary system for remotely interacting with client system 20 where the connection is not always-on. The set top box 22 is connected to a network 40 by a connection 53. The connection 53 is bi-directional and may include cable modem lines, standard telephone lines, Integrated Services Digital Network (ISDN) lines, DSL lines, cable lines associated with cable television service, or the like to connect to a network such as the Internet. The set top box 22 may also receive programming content and other data from a satellite 52. However, because the programming content is received from the satellite 52, the connection 53 is not always on. If the connection 53 is not on, then the set top box 22 cannot be accessed and events cannot be scheduled primarily because the satellite 52 only transmits programming information and cannot receive data from the set top box 22.

To remotely access and program the client system 20 in this example, the user connects the access device 44 to the network 40. The user then accesses a satellite server 50 via network 40 and uses the access device 44 to input instructions to satellite server 50 that will ultimately be sent to the set top box 22. Often these instructions are included in the conditional access data, but they can be transmitted in other formats as well. The instructions cause the set top box 22 to open the connection 53. Once the connection 53 is turned on, the user may directly access set top box 22 via network 40 and over connection 53 in the same manner as described in FIGS. 2 and 3. It is contemplated that an authentication service and/or a device service may also be implemented in this example as described in FIG. 3. When the user has finished remotely accessing and programming the set top box 22, the set top box 22 disconnects the connection 53 from the network 40.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for remotely scheduling events at the client system with an access device, in a system that is comprised of an access device, a programmable client system and a provider, all of which are logically interconnectable through a network such as the Internet, wherein the client system stores program guide data that is used by a user to schedule events, the method comprising steps for:
    using an access device that is remotely located from the programmable client system to access and log on an access device service;
    in response to logging on the access device service, authenticating a user of the remotely located access device with an authentication service which is associated with the access device service;
    subsequent to authenticating the user with the authentication service, accessing the client system through the network with the remotely located access device, wherein the client system has a bi-directional connection with the network, and wherein prior to accessing the client system through the network, causing the client system to establish the bi-directional connection by performing the following:
        sending instructions to a broadcast source that is connected to the client system through a unidirectional connection inasmuch as the broadcast source only transmits programming information to the client system without receiving data from the client system, wherein the broadcast source transmits the instructions to the client system, and wherein the instructions cause the client system to open a bi-directional connection with the network;
    automatically authenticating the user of the remotely located access device to the client system by providing authentication information previously issued to the user from the authentication service, and in response to the user having been previously authenticated by the authentication service through the access device service;
    once the user of the remotely located access device is authenticated to the client system, retrieving current program guide data from the client system with the remotely located access device, wherein the current program guide data is displayed on the remotely located access device;
    selecting an event using the retrieved program guide data displayed at the remotely located access device;
    sending the selected event to the client system; and
    scheduling the selected event at the client system.

2. A method as defined in claim 1, wherein the step for authenticating a user of the remotely located access device further comprises a step for authenticating the user at the client system with an authentication service.

3. A method as defined in claim 1, wherein the step for retrieving the current program guide data from the client system further comprises steps for:
    displaying a schedule of programming content that is scheduled to be sent to the client system on the access device; and
    displaying previously scheduled events on the access device.

4. A method as defined in claim 1, wherein the step for selecting an event at the remotely located access device further comprises a step for selecting one or more programs identified in the current program guide data to be associated with an event.

5. A method as defined in claim 1, wherein the step for selecting an event at the remotely located access device further comprises a step for unselecting one or more of the programs previously selected and associated with an event, wherein the associated event is removed from the selected programs.

6. A method as defined in claim 1, wherein the step for selecting an event at the remotely located access device further comprises one or more of:
    a step for setting preferences in the current program guide data;
    a step for selecting a record event;
    a step for selecting a delete event; and
    a step for selecting a lock or unlock event.

7. A method as defined in claim 1, further comprising:
    a step for formatting, by the device service, the retrieved current program guide data for the specific access device.

8. A method as defined in claim 7, wherein the step for formatting, by the device service, the retrieved current program guide data for the specific access device comprises formatting the retrieved current program guide for display on a cell phone by formatting the retrieved current program guide as a menu driven configuration suitable for a cell phone.

9. A method as recited in claim 1, further including:
    connecting the set top box to the network with a connection that is always on line with the network.

10. A method as defined in claim 1, wherein the access device is one of a cell phone, laptop computer, desktop computer, handheld computer, or internet appliance.

11. A method as defined in claim 10, wherein the act of retrieving the current program guide data further comprises an act of automatically formatting the current program guide data retrieved from the set top box at the device service to a format appropriate for display by the cell phone, laptop computer, desktop computer, handheld computer, or internet appliance.

12. A method as defined in claim 1, wherein the current program guide data retrieved from the client system further comprises a programming content scheduled to be sent to the set top box from a satellite, wherein the current program guide data includes previously scheduled events.

13. A method as defined in claim 1, wherein the step for selecting an event further comprises an act of selecting one or more programs, wherein the programming content of the selected one or more programs will be recorded.

14. A method as defined in claim 1, wherein the step for selecting an event further comprises an act of unselecting one or more programs previously selected to be recorded, wherein the unselected one or more programs will not be recorded.

15. A method as defined in claim 1, wherein the step for selecting an event further comprises an act of changing the configuration of the current program guide data.

16. A method as defined in claim 1, wherein the step for selecting an event further comprises an act of locking or unlocking one or more channels of programming content available to the set top box from the satellite.

17. A method as defined in claim 1, wherein the step for selecting an event further comprises an act of deleting previously recorded programming content.

18. A method as recited in claim 1, wherein the client system comprises a set-top box associated with an IP address and through which the access device accesses the set-top box.

19. A method for remotely scheduling events at the client system with an access device, in a system that is comprised of an access device, a programmable client system and a provider, all of which are logically interconnectable through a network such as the Internet, wherein the client system stores program guide data that is used by a user to schedule events, the method comprising steps for:
sending instructions to a broadcast source that is connected to the client system through a connection that is unidirectional inasmuch as the broadcast source only transmits programming information to the client system without receiving data from the client system, wherein the broadcast source transmits the instructions to the client system, and wherein the instructions cause the client system to open a bi-directional connection with the network;
accessing the client system through the network with the remotely located access device through the bi-directional connection with the network;
retrieving current program guide data from the client system with the remotely located access device, wherein the current program guide data is displayed on the remotely located access device;
selecting an event using the retrieved program guide data displayed at the remotely located access device;
sending the selected event to the client system; and
scheduling the selected event at the client system.

20. A method as recited in claim 19, wherein the method includes authenticating a user of the remotely located access device to the client system prior to retrieving the program guide data.

21. A method as recited in claim 19, wherein the instructions are sent from the broadcast source within conditional access data that is broadcast to the client system.

22. A computer program product for implementing a method for remotely scheduling events at the client system with an access device, comprising:
a computer readable medium having encoded thereon computer executable instructions that are executed by a processor to implement the method recited in claim 1.

23. A computer program product as defined in claim 22, wherein the step for authenticating a user of the remotely located access device further comprises a step for authenticating the user at the client system with an authentication service.

24. A computer program product as defined in claim 22, wherein the step for retrieving the current program guide data from the client system further comprises steps for:
displaying a schedule of programming content that is scheduled to be sent to the client system on the access device; and
displaying previously scheduled events on the access device.

25. A computer program product as defined in claim 22, wherein the step for selecting an event at the remotely located access device further comprises a step for selecting one or more programs identified in the current program guide data to be associated with an event.

26. A computer program product as defined in claim 22, wherein the step for selecting an event at the remotely located access device further comprises a step for unselecting one or more of the programs previously selected and associated with an event, wherein the associated event is removed from the selected programs.

27. A computer program product as defined in claim 22, wherein the step for selecting an event at the remotely located access device further comprises one or more of:
a step for setting preferences in the current program guide data;
a step for selecting a record event;
a step for selecting a delete event; and
a step for selecting a lock or unlock event.

28. A computer program product as defined in claim 22, further comprising:
a step for formatting, by the device service, the retrieved current program guide data for the specific access device.

29. A computer program product as defined in claim 28, wherein the step for formatting, by the device service, the retrieved current program guide data for the specific access device comprises formatting the retrieved current program guide for display on a cell phone by formatting the retrieved current program guide as a menu driven configuration suitable for a cell phone.

30. A computer program product, as recited in claim 22, wherein the recited method includes connecting the set top box to the network with a connection that is always on line with the network.

* * * * *